Patented Nov. 16, 1937

2,099,651

UNITED STATES PATENT OFFICE 2,099,651

PLASTIC MATERIAL AND METHOD OF PRO-
DUCING THE SAME

Ernst Helft, Berlin-Halensee, Germany, assignor,
by mesne assignments, to "Unichem" Chemi-
kalien Handels A.-G., Zurich, Switzerland, a
corporation of Switzerland No Drawing. Application December 30, 1933, Se-
rial No. 704,754. In Germany December 31,
1932

19 Claims. (Cl. 106—23)

The present invention relates to the manufacture of rubber and other plastic material and more particularly to the introduction of various ingredients such, for example, as coloring matter, accelerators and other material introduced for loading or for other purposes.

The invention has for an object to provide an effective method of distributing the addition materials throughout the plastic mass and to produce a product of uniformity of composition and of high quality.

The invention has been developed more particularly in connection with the production of vulcanized rubber having incorporated therein accelerators of various types together with coloring matter and other loading material and involves features more particularly applicable to rubber compounds. The invention, however, is not limited to rubber mixtures but may be applied to various other plastic mixtures especially those in which pulverulent or granular material is to be incorporated. In prior applications, especially application Ser. No. 641,039, filed November 3, 1932, the use of fatty alcohol as a dispersing agent and for improving the quality of a rubber composition and other plastic materials is described. It has now been discovered that not only the alcohols themselves but their derivatives can be used with similar advantages and in some respects with further advantages.

The alcohols or their derivatives may either be mixed with the addition material, such as carbon black or other coloring or loading matter, accelerators, anti-aging agents or other addition materials and especially the dusty or granular components and then this mixture added to the rubber or other base material, or the alcohols or their derivatives and the other addition material may be added at one time to the mix and the whole worked together.

The alcohol derivatives used are the derivatives of the fatty or at least oily saturated and unsaturated alcohols, including the poly-hydric alcohols, of the aliphatic series containing 8 or more carbon atoms in the molecule. The lauryl, cetyl, stearyl, hydroxy-stearyl, oleyl, and ricinoleyl alcohols are probably the most satisfactory and the most commercially practicable as basic materials because the most readily available as produced from the natural fats and waxes and these alcohols are sufficiently illustrative of the class. Similar alcohols of lower molecular weight, for example, having 8 or 10 carbon atoms as well as those of higher molecular weight such as those containing 22 or even 30 carbon atoms can be used advantageously.

The naphthenic alcohols and their derivatives may also be used as dispersing agents in accordance with the invention.

The derivatives of the alcohols may be, for example, the ethers with the same or with lower molecular alcohols, the esters with mono- or poly-basic acids, or the acid esters of organic or inorganic di-basic acids, preferably neutralized with alkali metals or organic bases.

The ethers may include those in which a fatty or oily alcohol is condensed with the same or another high molecular alcohol or with a lower molecular primary alcohol which may be one having as few as 1 or 2 carbon atoms in the molecule or any of the other primary aliphatic alcohols either saturated or unsaturated and mono- di- or poly-hydric. The butyl alcohol and glycerol may be cited as examples of the low molecular alcohols. Phenol and the naphthenic alcohols also may serve as the second component of the ether.

The esters may be those formed from a fatty or oily alcohol and a mono-basic primary straight chain acid of the aliphatic series having from 1 to 30 carbon atoms in the molecule, as, for example, formic, acetic, acrylic, butyric, caproic, caprylic, capric, lauric, myristic, palmitic, stearic, oleic, linolic, linolenic, ricinoleic, cerotic, melissic, which are sufficiently representative, or a poly-basic organic or inorganic acid, for example, the organic di-basic acids having from 2 to 20 carbon atoms in the molecule with or without hydroxyl groups, naphthenic, aromatic and hydro-aromatic di-basic acids of which illustrative examples are oxalic, malonic, succinic, adipic, tartaric, pyrotartaric, pimeric, suberic, azelaic, sebacic, brassylic, boccellic, benzoic, phthalic, hydro-phthalic, cyclohexan-diacetic, sulfuric, halogen sulfonic, phosphoric acid and the like or anhydrides of the same.

The esters of high molecular alcohol with di-basic acids may be either di-substituted esters or acid esters. If acid esters, they may be used as such, but preferably they are neutralized with alkali metals, alkali earths or any of the organic bases of which illustrative examples are piperidine, chinoline, tri-ethylamine, cyclo-hexylamine, tri-ethanolamine, tri-propanolamine.

The fatty and oily alcohols and their derivatives not only are excellent dispersing agents and aid in the mixing of the ingredients with rubber or other plastic material, but at least in the case of rubber they also improve the strength and quality of the material. Because of their high boiling points they do not evaporate and are enduring in their effects.

The proportions of alcohol or of the derivatives may vary within wide limits. As compared with the total mass of the rubber or of the other plastic materials they may be present in as small a proportion as 0.1 or 0.2% of the total mass and yet have a substantial beneficial effect. On the other hand they may be increased to 3 or 5% and even to a greater extent as, for example, 10 or 15% of the total weight. Ordinarily the best results are obtained if the proportion does not exceed 5 or perhaps 10%. Probably the most effective proportions are between 0.1 and 5%.

Apparently the proportion of the alcohol or its derivative to be used varies relatively little, if any, with the greater or less amount of addition material such as, for example, carbon black, red oxide of iron or other usual coloring and loading materials or liquid or semi-liquid addition materials. Obviously the proportion of alcohol or its derivatives to the addition material may vary within extremely wide limits depending upon the proportion of the material to be added to the rubber mix. In usual practice the weight of the alcohol will approximate 0.3 to 15% or sometimes 100% of the weight of the addition materials.

While the use of the alcohol or alcohol derivative as a dispersing agent is especially of advantage when adding dusty or granular material, it is also useful as an aid in distributing liquid or semi-liquid ingredients. This is true both in making rubber mixtures and in the compounding of other plastic materials.

*Example 1.*—A rubber composition is prepared containing—

| | Parts by weight |
|---|---|
| First latex | 100 |
| Zinc oxide | 5 |
| Mineral rubber | 8 |
| Carbon black | 40 |
| Accelerator | 1¼ |
| Sulfur | 3½ |
| Stearine | 1 | together with 2 parts of the sodium salt of the adipic acid acid ester of oleyl alcohol as a dispersing agent. The mixture may be vulcanized under a gradually increasing heat. The product is of a considerable better quality than a similar mixture without the addition of the above named dispersing agent.

*Example 2.*—A rubber composition comprises—

| | Parts by weight |
|---|---|
| Latex (75%) | 13 |
| Chalk | 40 |
| Zinc oxide | 4 |
| Sulfur | 2 |
| Pentamethylendicarbamate of piperidine | 1.2 | together with 2 parts of the sodium salt of the sulfuric acid acid ester of dodecyl alcohol.

*Example 3.*—When rubberizing fabric 1 to 2% of sulfuric acid ester salts of the type above described are added to the latex lithopone mixture to improve the spreading and penetrating properties.

*Example 4.*—For the purpose of producing carbon-rubber-mixtures of high quality, 24 parts of soot (carbon black) are carefully mixed by grinding or in other suitable manner with 1.2 parts of an ester of fatty alcohol, such for example the cetyl ester of ricinolic acid. The mixture thus obtained is added on the roller to a usual rubber mixture, for example to a mixture consisting of 60 parts of rubber (first latex crepe); 5.25 parts mineral rubber; 6 parts of ZnO; 0.6 parts stearic acid; 0.75 parts of diphenylguanidine; 2.2 parts of sulfur and after the plasticising the resulting mixture is vulcanized in the usual manner. In the same manner as the cetyl ester of ricinolic acid is also applicable in this batch the dodecyl ester of the butyric acid.

*Example 5.*—For the purpose of producing carbon-rubber-mixtures of high quality, 24 parts of soot (carbon black) are carefully mixed by grinding or in other suitable manner with 1.2 parts of an ether of fatty alcohol, such for example, the di-cetyl ether. The mixture thus obtained is added on the roller to a usual rubber mixture. For example to a mixture consisting of 60 parts of rubber (first latex crepe); 5.25 parts mineral rubber; 6 parts of ZnO; 0.6 part stearic acid; 0.75 part diphenylguanidine; 2.2 parts of sulfur and after the plasticizing the resulting mixture is vulcanized in the usual manner. In the same manner as the di-cetyl ether is also applicable in this batch the piperidine salt of the acid sulfuric acid ester of the mono-dodecyl ether of glycerol.

The term "fatty alcohols" is used in the claims as including the oily alcohols.

On account of the distributing and dispersing properties of these alcohols and their derivatives, the addition materials will be uniformly dispersed in the rubber or other plastic mass and at the same time the unpleasant effect upon the operative of mixing powdery materials with the mass are in large measure avoided.

It will be understood that the effective dispersion of loading materials in rubber to be used in thin sheets such as rubber gloves, toy balloons and the like is of the utmost importance.

The foregoing particular description is illustrative merely and is not intended as defining the limits of the invention.

I claim:

1. A rubber composition containing rubber, carbon black, and a sulfuric acid acid ester of a fatty alcohol neutralized with an alkali or an organic base.

2. The method of combining insoluble addition substances with rubber or rubber compositions which comprises mixing with the rubber or rubber compositions the usual compounding ingredients insoluble in the several ingredients of the compositions and a derivative of a high molecular fatty alcohol consisting of an ester of a primary straight chain aliphatic alcohol having 8 to 30 carbon atoms in the molecule with a primary straight chain aliphatic acid having 1 to 30 carbon atoms in the molecule.

3. The method of compounding a plastic composition which comprises mixing with plastic material insoluble pulverulent material and a dispersing agent consisting of an ester of a normal primary straight chain aliphatic alcohol having 12 to 18 carbon atoms in the molecule with an aliphatic acid.

4. The method of compounding a plastic composition which comprises mixing with plastic material insoluble pulverulent material and a dispersing agent consisting of an ester of a normal primary aliphatic alcohol having 12 to 18 carbon atoms in the molecule with a mono-basic primary straight chain aliphatic acid.

5. The method of combining insoluble addition substances with rubber or rubber-compositions which comprises mixing with the rubber or rubber-compositions usual insoluble pulverulent compounding ingredients and as a dispersing agent therefor an ester of a straight chain aliphatic alcohol having 8 or more carbon atoms in the molecule with a mono-basic primary straight chain aliphatic acid having 1 to 30 carbon atoms in the molecule.

6. The method of combining insoluble addition substance with rubber or rubber-compositions which comprises mixing with the rubber or rubber-compositions usual insoluble pulverulent compounding ingredients and as a dispersing agent therefor an ester of a straight chain aliphatic alcohol having 8 or more carbon atoms in the molecule with a dibasic organic acid having 2 to 20 carbon atoms in the molecule.

7. The method of combining insoluble addition substances with rubber or rubber-compositions which comprises mixing with the rubber or rubber-compositions usual insoluble pulverulent compounding ingredients and as a dispersing agent therefor an ester of a normal primary aliphatic alcohol having 12 to 18 carbon atoms in the molecule with a monobasic primary straight chain aliphatic acid having 1 to 30 carbon atoms in the molecule.

8. The method of combining insoluble addition substances with rubber or rubber-compositions which comprises mixing with the rubber or rubber-compositions usual insoluble pulverulent compounding ingredients and as a dispersing agent therefor an ester of a normal primary aliphatic alcohol having 12 to 18 carbon atoms in the molecule with a dibasic organic acid.

9. The method of combining insoluble addition substances with rubber or rubber-compositions which comprises mixing with the rubber or rubber-compositions usual insoluble pulverulent compounding ingredients and as a dispersing agent therefor an ester of a normal primary aliphatic alcohol having 12 to 18 carbon atoms in the molecule with a dibasic organic aliphatic acid having 2 to 20 carbon atoms in the molecule.

10. A rubber-composition comprising rubber, usual compounding ingredients insoluble in the several ingredients of the composition and as a dispersing agent an ester of a normal primary straight chain aliphatic alcohol having 12 to 18 carbon atoms in the molecule with an aliphatic acid.

11. A rubber-composition comprising rubber, usual compounding ingredients insoluble in the several ingredients of the composition and as a dispersing agent an ester of a straight chain aliphatic alcohol having 8 or more carbon atoms in the molecule with a mono-basic primary straight chain aliphatic acid having 1 to 30 carbon atoms in the molecule.

12. A rubber-composition comprising rubber, usual compounding ingredients insoluble in the several ingredients of the composition and as a dispersing agent an ester of a straight chain aliphatic alcohol having 8 or more carbon atoms in the molecule with a dibasic organic acid having 2 to 20 carbon atoms in the molecule.

13. A rubber-composition comprising rubber, usual compounding ingredients insoluble in the several ingredients of the composition and as a dispersing agent an ester of a normal primary aliphatic alcohol having 12 to 18 carbon atoms in the molecule with a monobasic primary straight chain aliphatic acid having 1 to 30 carbon atoms in the molecule.

14. A rubber-composition comprising rubber, usual compounding ingredients insoluble in the several ingredients of the composition and as a dispersing agent an ester of a normal primary aliphatic alcohol having 12 to 18 carbon atoms in the molecule with a dibasic organic acid.

15. A rubber-composition as defined in claim 10 wherein the dispersing agent is of a proportion of 0.1 to 5% of the composition.

16. A rubber-composition as defined in claim 12 wherein the dispersing agent is of a proportion of 0.1 to 5% of the composition.

17. A plastic mass comprising, in combination, a caoutchouc base material, insoluble pulverulent or granular addition material and, as a dispersing agent, a derivative of a high molecular alcohol consisting of an ester of a primary straight chain aliphatic alcohol having 8 to 30 carbon atoms in the molecule with a primary straight chain aliphatic acid having 1 to 30 carbon atoms in the molecule.

18. A plastic mass comprising, in combination, a caoutchouc base material, insoluble pulverulent or granular addition material and, as a dispersing agent, a derivative of a high molecular alcohol consisting of an ester of a primary straight chain aliphatic alcohol having 8 to 18 carbon atoms in the molecule with a primary straight chain aliphatic acid having 1 to 18 carbon atoms in the molecule.

19. A plastic mass comprising, in combination, a caoutchouc base material, insoluble pulverulent or granular addition material and, as a dispersing agent, a derivative of a high molecular alcohol consisting of an ester of a primary straight chain aliphatic alcohol having 8 to 18 carbon atoms in the molecule with a dibasic inorganic acid of the group consisting of sulfuric acid, halogen acids, halogen sulfonic and phosphoric acids and their anhydrides.

ERNST HELFT.